(12) United States Patent
McDaniel

(10) Patent No.: US 6,234,741 B1
(45) Date of Patent: May 22, 2001

(54) FORKLIFT FOR PICKUP TRUCKS

(76) Inventor: Stanley P. McDaniel, R & R Plastics, Inc. P. Box 550, Ellenboro, NC (US) 28040

( * ) Notice: Subject to any disclaimer, the term of this patent is extended or adjusted under 35 U.S.C. 154(b) by 0 days.

(21) Appl. No.: 09/506,880

(22) Filed: Feb. 18, 2000

Related U.S. Application Data

(60) Provisional application No. 60/124,166, filed on Mar. 15, 1999.

(51) Int. Cl.[7] ........................................ B60P 1/00
(52) U.S. Cl. .................. 414/546; 414/914; 414/541; 254/10 R
(58) Field of Search ............................... 414/920, 917, 414/462, 539, 540, 545, 547, 551, 498, 685, 700, 24.5, 495; 254/10 R, 10 B, 10 C

(56) References Cited

U.S. PATENT DOCUMENTS

| | | | |
|---|---|---|---|
| 3,913,759 | * 10/1975 | Deacon | 414/917 X |
| 3,918,592 | * 11/1975 | Paul | 414/541 X |
| 4,509,894 | * 4/1985 | Rolfe | 414/917 X |
| 4,583,907 | * 4/1986 | Wimberley | 414/917 X |
| 4,671,729 | * 6/1987 | McFarland | 414/546 X |
| 4,808,056 | * 2/1989 | Oshima | 414/462 |
| 5,271,707 | * 12/1993 | Derksen et al. | 414/917 X |

* cited by examiner

Primary Examiner—Frank E. Werner
(74) Attorney, Agent, or Firm—Charles E. Temko

(57) ABSTRACT

An hydraulically operated fork lift device adapted to be installed within the bed of a conventional pickup truck, wherein the horizontal movement of the fork is provided by movement of the truck. When the device is not in use, it is disposed above the forward portion of the truck bed.

2 Claims, 4 Drawing Sheets

FORKLIFT FOR PICKUP TRUCKS

This application claims herefit of Provisional Appl. No. 60/124,166, filed Mar. 15, 1999.

BACKGROUND OF THE INVENTION

This invention relates generally to the field of hoisting devices, and more particularly to an improved form of forklift device adapted to be mounted within the bed of light and medium-sized pickup trucks in such manner that a load may be transferred from ground level into the confines of the truck bed.

Forklift trucks for local use are well known in the art. However, they are not suitable for transporting a pallettized load over a substantial distance prior to unloading. It is also known in the art to provide relatively large trucks with a relatively large hydraulically powered tailgate capable of rotational movement from open to closed position, and in addition, capable of motion in a horizontal plane from ground level to the level of the floor of the truck. These devices do not usually include means to transfer a load from the tailgate into the interior of the truck, a task which often requires more than a single person to complete.

Other devices known in the art include an hydraulically-operated hoist which pivots about a transverse axis disposed medially of the truck frame which is adapted to lift specialized containers containing refuse over the cab of the truck and dump the contents within a storage receptacle disposed rearwardly of the cab.

Such devices are not suitable for use with relatively smaller or medium-sized trucks of relatively limited capacity which are often employed for such tasks as delivering relatively heavy household appliances, such as refrigerators, freezers, stoves, and the like, in which the load must be manually lifted from ground level to the level of the bed of the truck, and subsequently unloaded at the delivery location. In many cases, this operation requires at least two persons of adequate strength. Very often an old appliance is to be removed for disposal, wherein the task is repeated.

SUMMARY OF THE INVENTION

Briefly stated, the invention contemplates the provision of an improved self-contained device which can be more or less permanently installed at the front end of the bed of a relatively smaller pickup truck which is adapted to lift a pallettized load from ground level and transfer the same to a safe position within the bed of a truck for transportation to a desired location for delivery. The maneuvering normally accomplished by a conventional forklift truck is provided by movement of the truck itself which positions the device relative to the load to permit lifting and lowering of the same. In many cases, this operation may be performed by a single person.

BRIEF DESCRIPTION OF THE DRAWINGS

In the drawings, to which reference will be made in the specification, similar reference characters have been employed to designate corresponding parts throughout the several views.

DETAILED DESCRIPTION OF THE DISCLOSED EMBODIMENT

Figure 1:
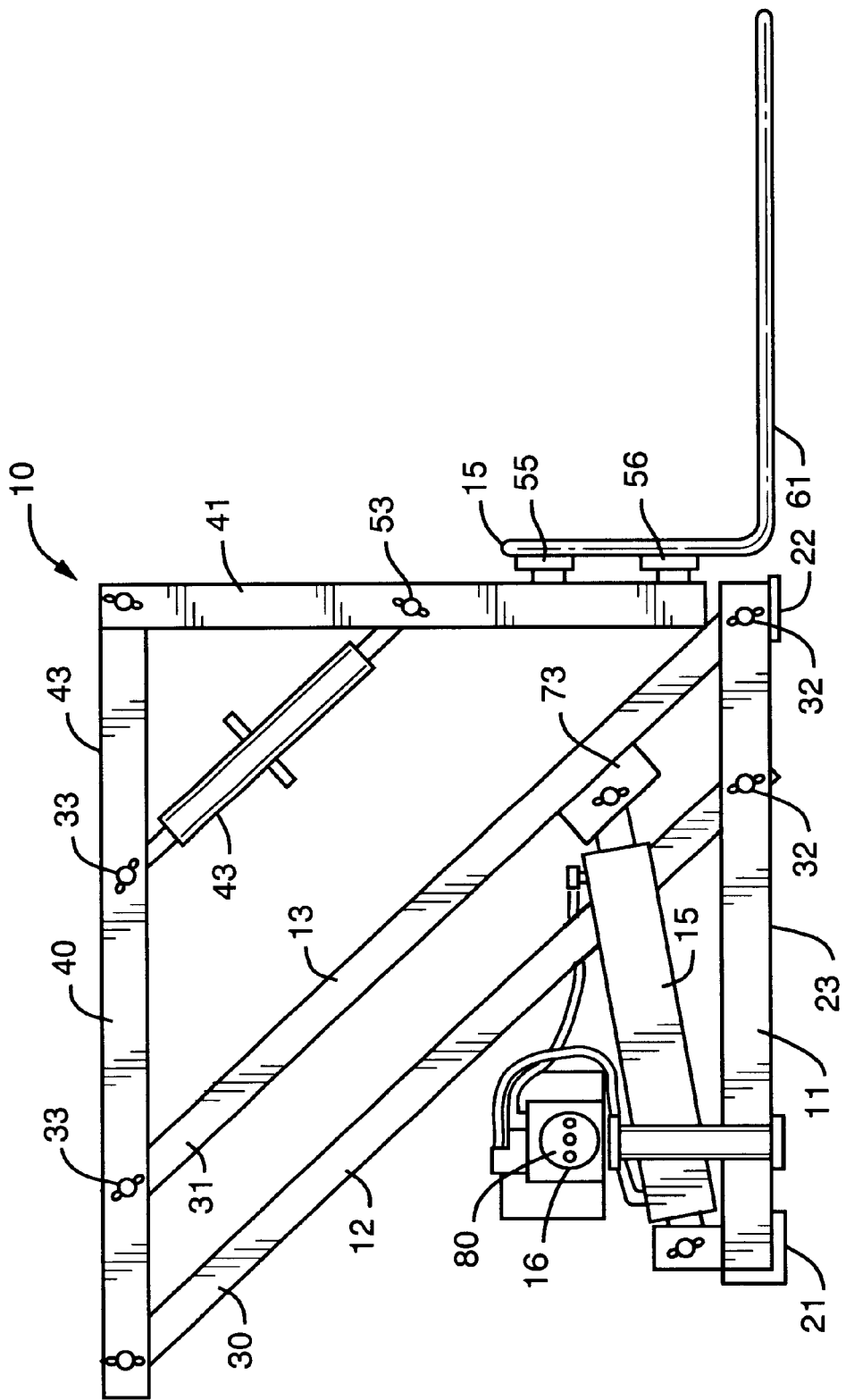
FIG. 1 is a side elevational view of an embodiment of the invention.
Figure 2:
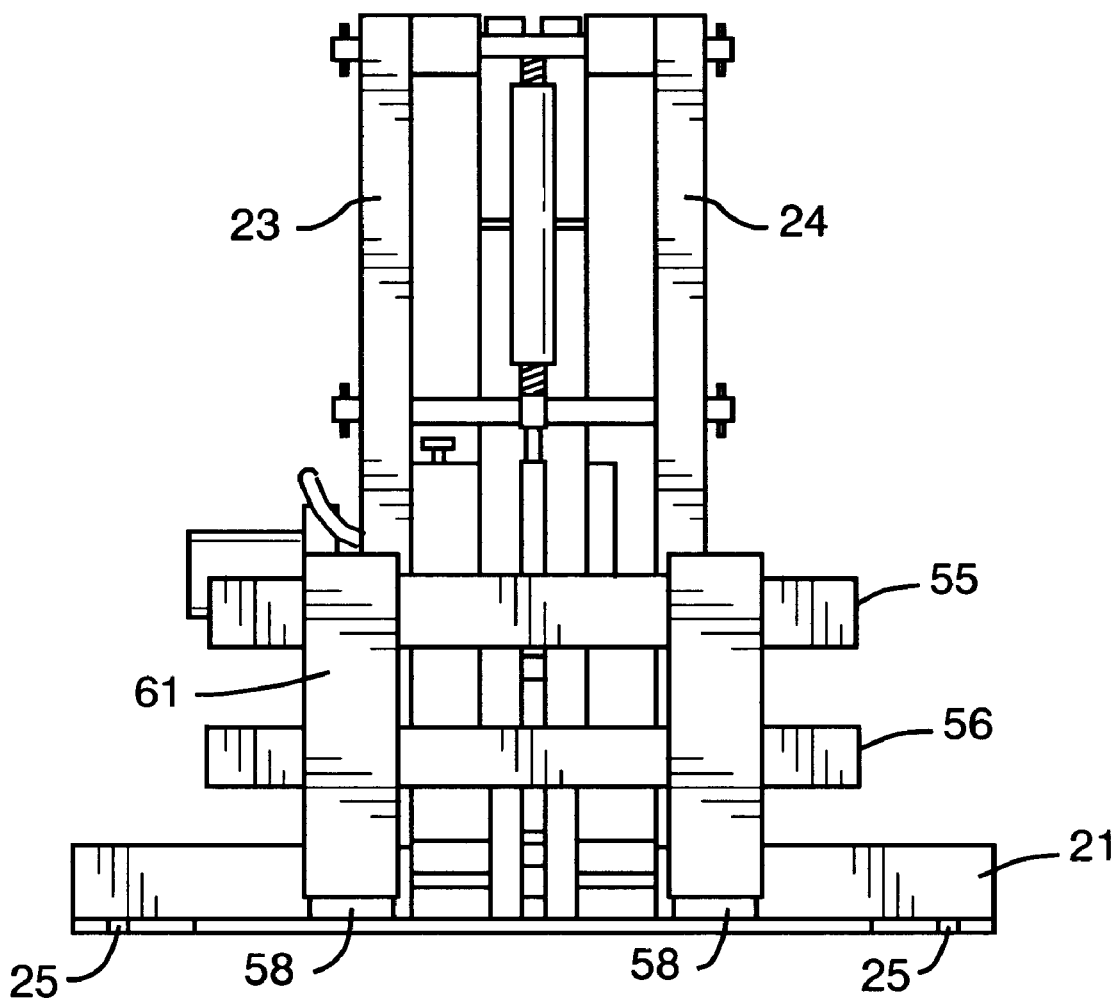
FIG. 2 is an end elevational view thereof.
Figure 3:
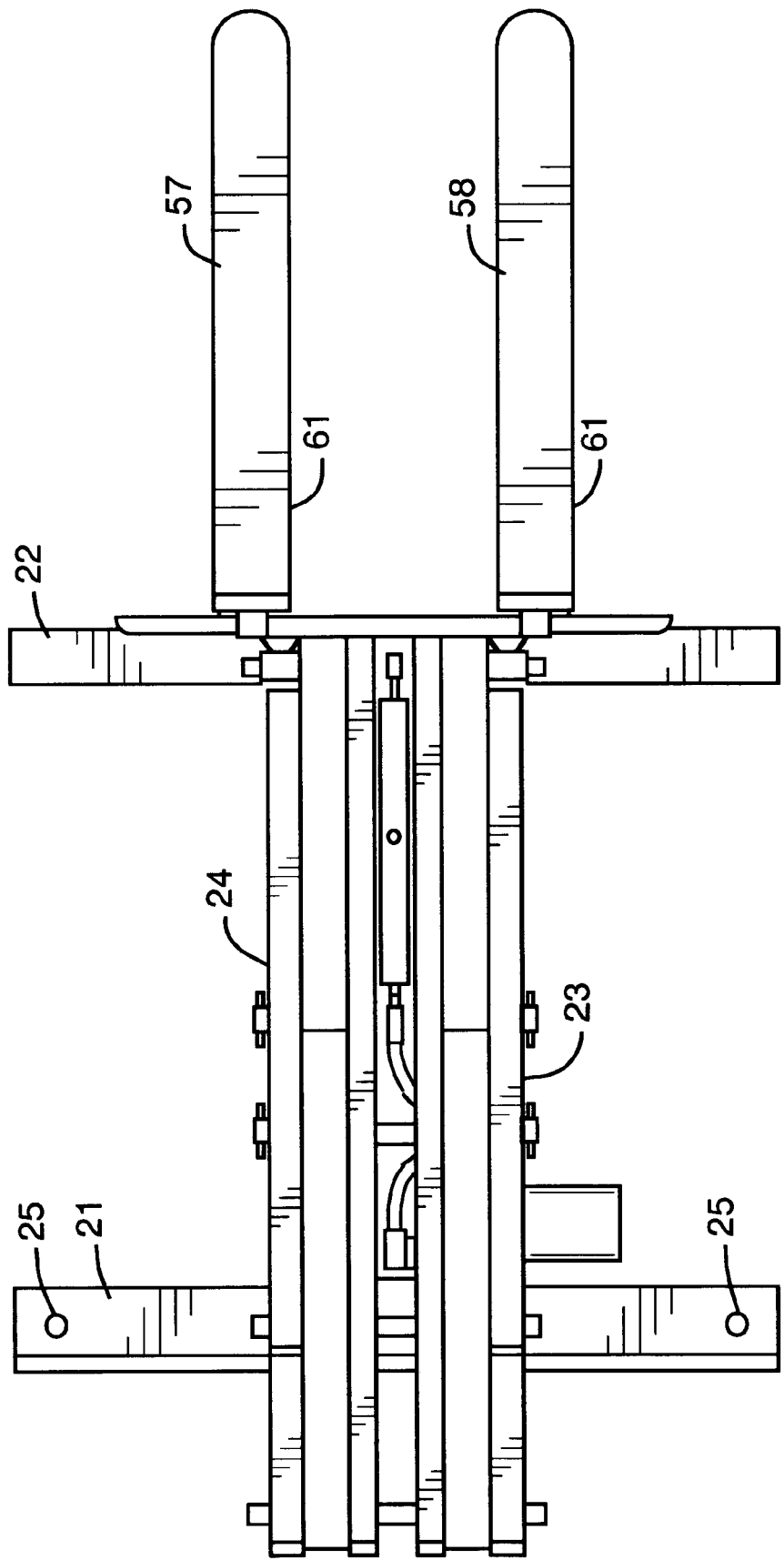
FIG. 3 is a top plan view thereof.

In accordance with the invention, the device, generally indicated by reference character 10, comprises broadly: a base element 11, first and second parallel linkage elements 12 and 13, a forklift element 15, an hydraulic cylinder element 15, and a direct current power element 16.

The base element 11 is most conveniently formed from angle iron, and includes a forward member 21, a rearward member 22, as well as medially positioned side members 23 and 24. The forward member is provided with bolt holes 25 and nut and bolt means 26 which penetrate normally available openings in the truck chassis 27 to secure the base element in position within the bed of the truck. Normally, anchoring is required at the forward member 21, although the rearward member 22 may be secured in a similar manner.

The first and second linkage elements 12 and 13 include a pair of forward struts 30 and a pair of rearward struts 31. The forward ends of each of the struts are pivotally mounted at points 32 to the base element 11. The rearward ends of the struts are pivotally mounted at 33 to corresponding points on the forklift element 14. Most conveniently, this is accomplished by pintles which are held in position by cotter keys 35 which facilitates disassembly of the forklift element from the base element during periods of time when the truck is used for tasks not requiring a forklift.

The forklift element 14 is also conveniently formed from the angle iron and includes a first horizontally-oriented frame 40, and a second vertically-oriented frame 41. The first frame 40 includes a forward end 42 and a rearward end 43. A first set of front openings 44 interconnects with the first linkage element 12. A second set of openings 45 interconnects with the second members 31 of the linkage element. A third opening 46 interconnects with a forward end 47 of a turn buckle 48, while a fourth opening 49 provides interconnection with the second frame 41.

The frame opening is adjusted for right angularity with respect to the first frame 40 by adjusting a turn buckle 48. It includes an upper end having first openings 52, medially-positioned openings 53 for engaging the rearward end of the turn buckle 48, and a lower end 54 which mounts welded brackets 55 and 56 which mount first and second forks 57 and 58 which project rearwardly therefrom.

The forks 57–58 are of conventional configuration, including a shorter vertical member 60 carried by the brackets 55–56, and longer horizontal member 61 which are adapted to be positioned beneath a pallettized load (not shown) in normal fashion.

The hydraulic cylinder element 15 is of conventional construction, including an outer cylinder member 70 and an internal piston 71, a rearward end 72 of which is interconnected to a transverse beam 73. The opposite end of member 70 is interconnected by a pintle 75 to extensions, one of which is indicated by reference character 76 which form part of the base element 11. First and second hydraulic hoses 77 and 78 interconnect opposite ends of the interior of the cylinder to the power element 16.

The power element 16 is designed to be operated from the truck battery, and includes a reversible direct current motor 80. It drives an hydraulic pump 81 which supplies fluid through the hoses 77 and 78 to the cylinder member 70 in known fashion. The motor 80 may be provided with a mercury switch (not shown) sensitive to pivotal movement of the truck about its rear axle which might occur when excessively heavy load is attempted to be lifted, to stop operation of the motor 80.

Figure 4:
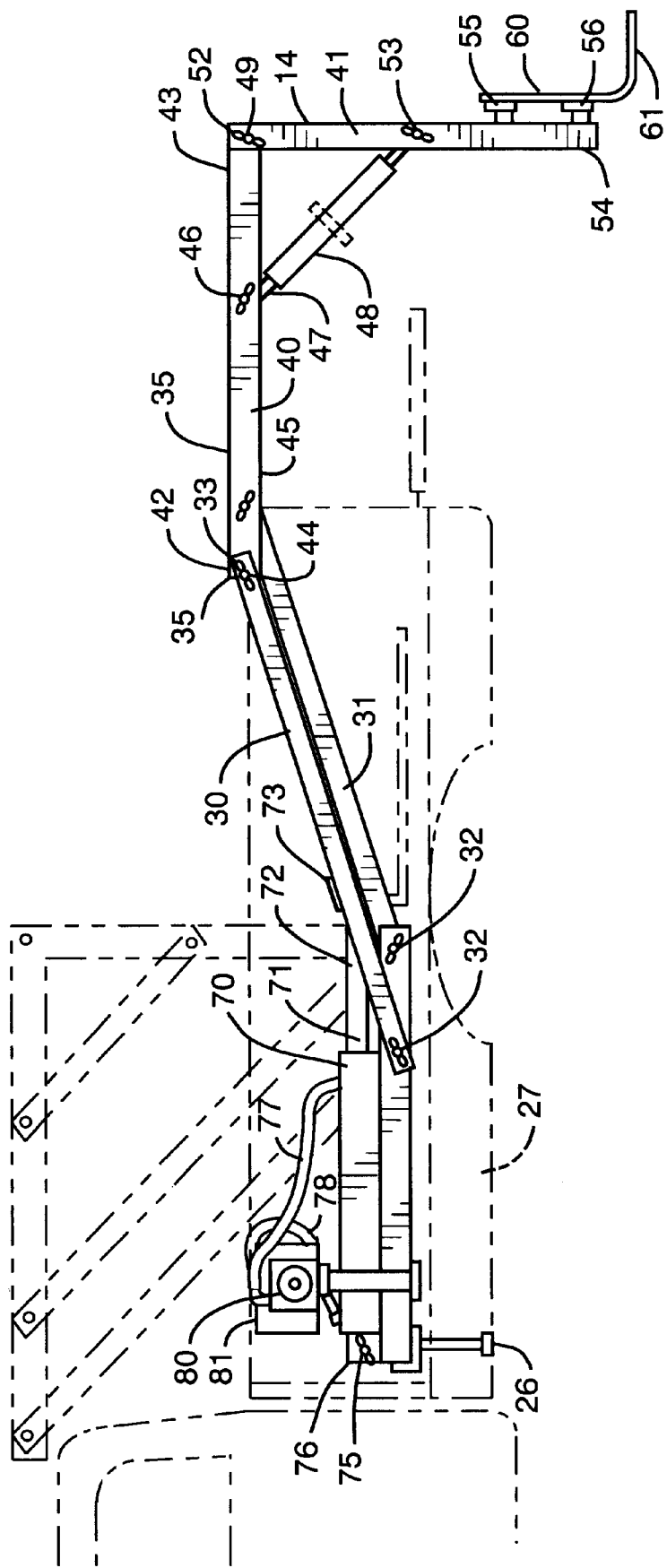
FIG. 4 is a side elevational view corresponding to that seen in FIG. 1, but showing certain of the component parts in altered relative position.

FIG. 4 illustrates the position of the device in extended position ready to receive a load to be lifted and placed at the rear of the bed of the truck 90. In keeping with the size of the truck, typically of one-half ton capacity, a useful weight limit lies in the range below thirteen hundred pounds. The retracted position of the device is indicated in FIG. 4 in dashed lines.

With the load (not shown) engaged, the power unit is operated from the truck battery to result in the device moving to the retracted position to position the load within the truck bed as shown in FIG. 1. When the load reaches its destination, the power element is reversed to deposit the load at ground level.

When the device is not in use for an extended period of time, it may be partially disassembled by disconnecting the forklift element and parallel linkage elements from the base element to make available more of the storage space in the truck bed. The power unit is preferably operated with the engine of the truck running, so as to provide maximum amperage, particularly when the load is being lifted.

I wish it to be understood that I do not consider the invention to be limited to the precise details of structure shown and described in the specification, for obvious modifications will occur to those skilled in the art to which the invention pertains.

I claim:

1. A forklift device for use in conjunction with an open bed of a pickup truck, said bed having forward and rearward areas, comprising: a generally planar base element; means for interconnecting a surface of said base element in fixed relation with an upper surface of said bed substantially at said forward end thereof; a forklift element interconnected to said base element, including a first horizontal frame member, a second vertical frame member interconnected thereto at a rearward end of said horizontal frame member; parallel linkage means having first and second ends, a first end to said base element, and at a second end to a rearwardly-facing end of said horizontal frame member; and powered means including an hydraulic cylinder pivotally interconnected at one end thereof to said base element, and at a second end thereof to said parallel linkage means; whereby said forklift element is movable between a first extended position in which said forklift element is positioned to engage a load supported at ground level, and a second retracted position in which said element is positioned within said bed, and forwardly of said load.

2. A device in accordance with claim 1, in which said forklift element and said linkage means are selectively disconnectable from said base element to provide additional storage space within said bed.

\* \* \* \* \*